United States Patent

Morita

[11] Patent Number: 5,479,304
[45] Date of Patent: Dec. 26, 1995

[54] MAGNETIC DISK APPARATUS HAVING A BRACKET WITH REINFORCEMENT PLATE

[75] Inventor: Isao Morita, Tokyo, Japan

[73] Assignee: Kabushiki Kaisha Toshiba, Kawasaki, Japan

[21] Appl. No.: 343,875

[22] Filed: Nov. 17, 1994

Related U.S. Application Data

[63] Continuation of Ser. No. 38,482, Mar. 29, 1993, abandoned.

[30] Foreign Application Priority Data

Mar. 30, 1992 [JP] Japan ..................... 4-071976

[51] Int. Cl.⁶ ................................. G11B 17/08
[52] U.S. Cl. ................. 360/98.07; 360/99.08
[58] Field of Search ............... 360/99.08, 98.07, 360/99.12

[56] References Cited

U.S. PATENT DOCUMENTS

| | | | |
|---|---|---|---|
| 4,488,192 | 12/1984 | Treseder | 360/97.03 |
| 4,814,914 | 3/1989 | Hagiwara | 360/133 |
| 4,928,029 | 5/1990 | Wright | 360/99.08 |
| 4,998,033 | 3/1991 | Hisabe et al. | 360/98.07 |
| 5,008,573 | 4/1991 | Beppu | 360/99.08 |
| 5,142,173 | 8/1992 | Konno et al. | 360/98.07 |
| 5,143,459 | 9/1992 | Plutt | 360/98.07 |
| 5,200,866 | 4/1993 | Fruge | 360/99.08 |
| 5,264,975 | 11/1993 | Bajorek et al. | 360/98.02 |
| 5,291,358 | 3/1994 | Takahashi | 360/99.08 |

*Primary Examiner*—A. J. Heinz
*Attorney, Agent, or Firm*—Finnegan, Henderson, Farabow, Garrett & Dunner

[57] ABSTRACT

There is provided a magnetic disk apparatus wherein a hub is rotatably mounted on a hub holder of a bracket via bearings. A stator core and a motor coil are mounted on the outer side of the hub holder, and a yoke and magnet are mounted on the hub, thereby constituting a spindle motor. A magnetic disk is placed on a flange provided at one end portion of the hub. The disk is fixed between the flange and a disk clamper with a spacer interposed between the clamper and the disk. The bracket is formed of aluminum or a plastic material. A reinforcement plate made of an ion-based material or a ceramic material on a bottom surface of the bracket. Since the reinforcement plate is attached to the bracket, the rigidity of the bracket and the rigidity of the motor disk assembly can be increased without increasing the thickness of the bracket.

8 Claims, 3 Drawing Sheets

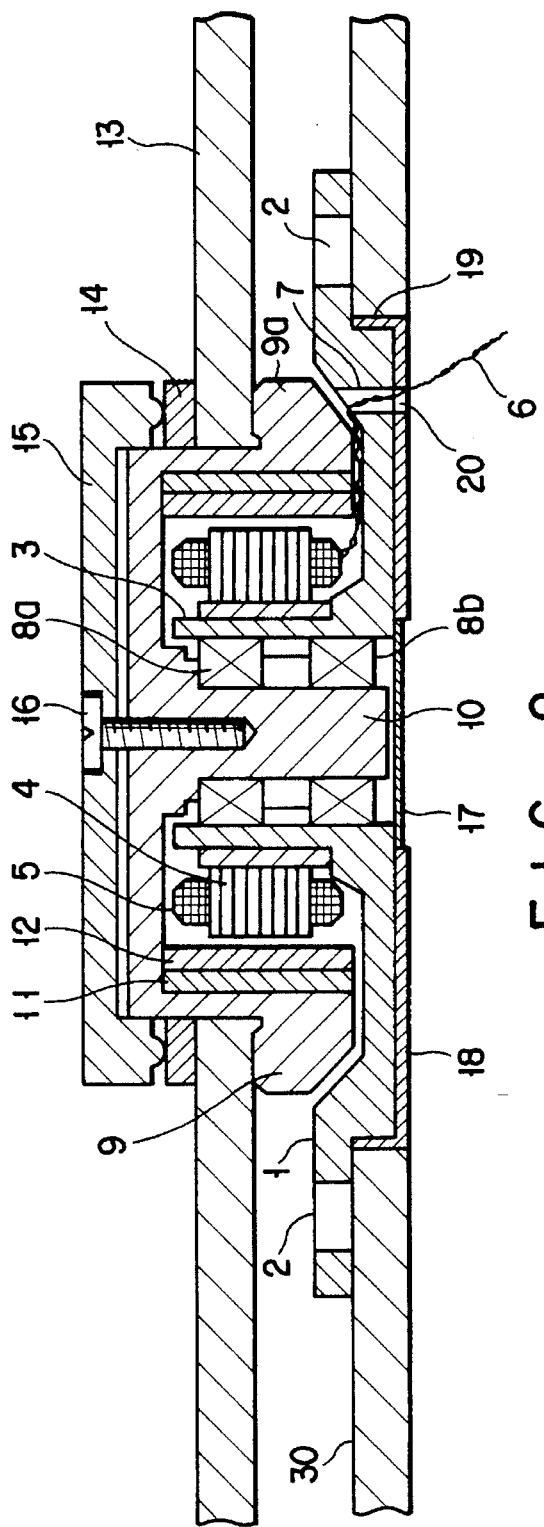

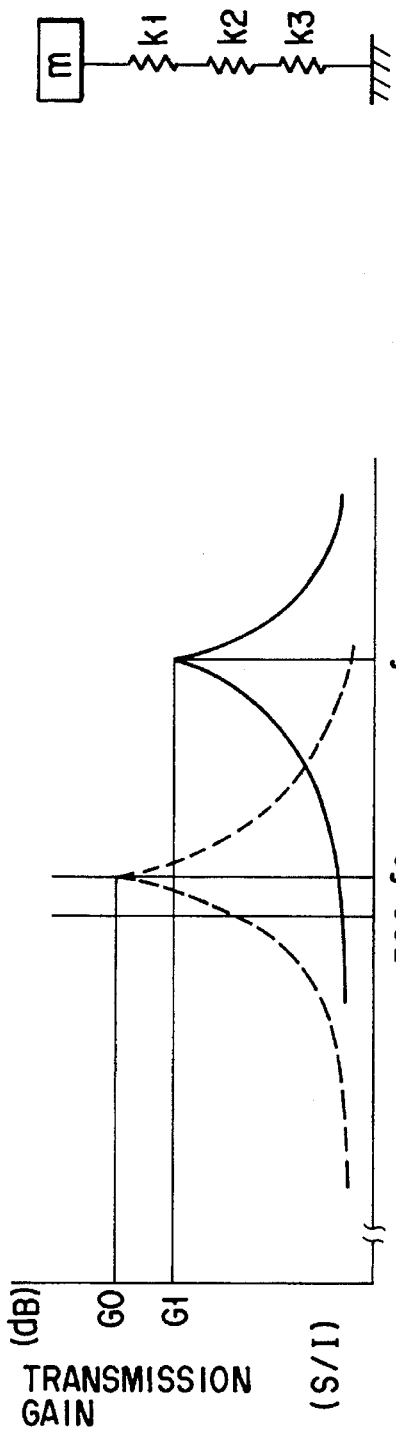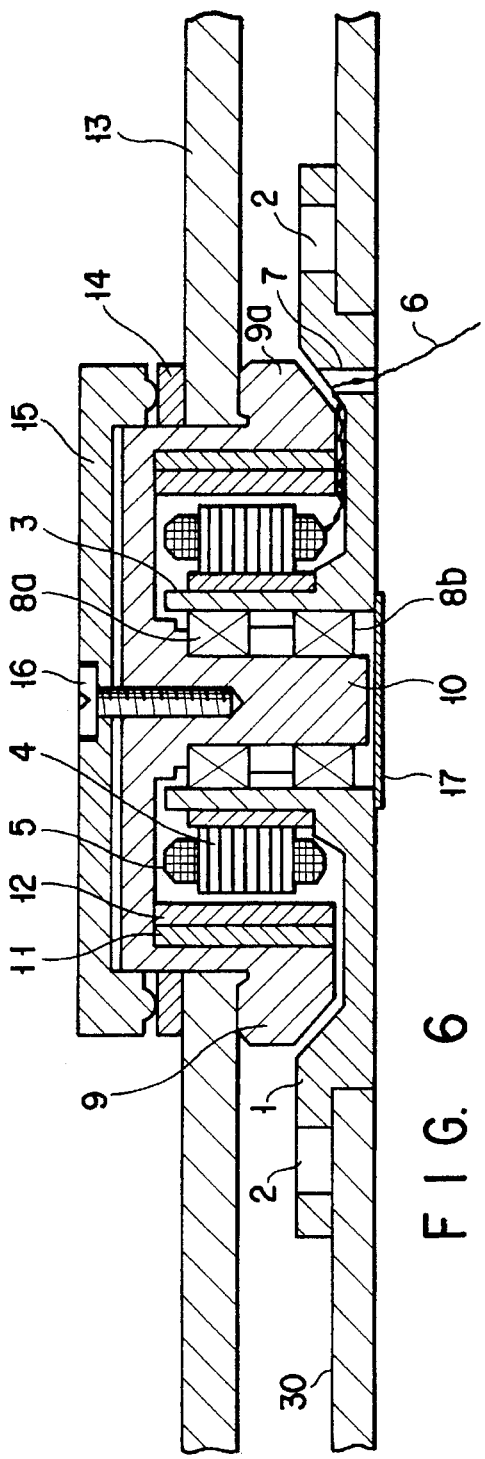

MAGNETIC DISK APPARATUS HAVING A BRACKET WITH REINFORCEMENT PLATE

This application is a continuation of application Ser. No. 08/038,482, filed Mar. 29, 1993, now abandoned.

BACKGROUND OF THE INVENTION

1. Field of the Invention

The present invention relates to a magnetic disk apparatus having a disk rotating motor.

2. Description of the Related Art

Recently, the size of a magnetic disk apparatus has been reduced more and more, and 2.5-inch magnetic disk apparatuses have been widely used in place of 3.5-inch magnetic disk apparatuses. In addition, 1.8-inch magnetic disk apparatuses have newly been introduced into the market.

As the diameter of a disk used in the magnetic disk apparatus is decreased, the width, length and height of the magnetic disk apparatus must be reduced accordingly. When the size of the apparatus is reduced, it is necessary to reduce the size of each part of the apparatus, while maintaining the required characteristics of the mechanisms of the apparatus. Furthermore, since the small-sized magnetic disk apparatus is used, for example, in a lap-top personal computer under relatively harsh conditions, it is important that the apparatus have good vibration-resistant properties and shock-resistant properties at the time of operation and non-operation.

Under the circumstances, in a small-sized magnetic disk apparatus, in particular, the vibration (resonance) properties of the mechanism of the apparatus in a low frequency range (e.g. about 500 Hz) are important.

In a simple model, the resonance frequency F is expressed by $$F \propto \sqrt{k/m} \quad (1)$$

($k$: rigidity; $m$: mass)

In the small-sized magnetic disk apparatus, the weight of each part is reduced, but the rigidity of the apparatus is degraded owing to the reduction in thickness of the apparatus. Thus, the resonance frequency of the entire apparatus reduces.

Where the resonance frequency in the direction of a motor shaft is low and the vibration transmission gain is high, a resonance phenomenon occurs when the apparatus is actuated and vibration of the disk is increased. Since a magnetic head performs read/write operations, while flying over the disk about 0.1 μm, the increase in vibration of the disk degrades the compliance characteristics of the magnetic head over the disk. In other words, the electromagnetic conversion performance is degraded.

When a resonance has occurred in a direction of the surface of the disk (a direction perpendicular to the motor shaft), the disk generally vibrates at a so-called non-synchronized frequency, which is near a resonance frequency which is different from an integer-number of times of the rotation frequency. Thus, the positioning precision of the magnetic head deteriorates and the apparatus performance lowers considerably.

In addition, in general, the operational vibration of the magnetic disk apparatus according to specifications is about 500 Hz at most. If the resonance frequency is about 500 Hz or less, the vibration characteristics against external disturbance during operation is degraded.

As regards a spindle motor, the material of a hub is aluminum, magnetic SUS (stainless steel), or free-cutting steel, whereas the material of a bracket is aluminum, e.g. die-cast aluminum. FIG. 5 shows a simplified model of axial rigidity where the hub rigidity is k1, bearing rigidity is k2 and bracket rigidity is k3, the motor rigidity K and resonance frequency F are expressed by $$K = k1 \cdot k2 \cdot k3 / (k2 \cdot k3 + k1 \cdot k3 + k1 \cdot k2) \quad (2)$$

$$F = (1/2\pi) \cdot (K/m)^{1/2} \quad (3)$$

Accordingly, in order to increase the resonance frequency, it is necessary to reduce the mass m or increase the hub rigidity k1, bearing rigidity k2 or bracket rigidity k3. In the case of the small-sized spindle motor, the bearing rigidity k2 is higher than the hub rigidity k1 or bracket rigidity k3. Thus, in order to solve a problem of vibration (rigidity), it is necessary to increase the hub rigidity k1 and/or bracket rigidity k3.

The bracket rigidity k3 can be increased by increasing the thickness of the bracket, but the limitation to the thickness dimension is strict in the small-sized magnetic disk apparatus. Thus, the thickness of the bracket cannot be greatly increased.

Summary of the Invention

The object of the present invention is to provide a magnetic disk apparatus having an increased bracket rigidity, and, accordingly, an increased resonance frequency of the entire apparatus, a decreased vibration transmission coefficient and an improved magnetic head compliance characteristics, without increasing the thickness of the bracket.

According to the present invention, there is provided a magnetic disk apparatus having a base plate comprising:

a recording medium for storing data;

a motor for rotating the recording medium, the motor having a bracket at a bottom portion thereof, the bracket being attached to the base plate; and a reinforcement plate, attached to the bracket of the motor, for increasing the rigidity of the bracket.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a cross-sectional view showing the structure of a main part of the magnetic disk apparatus shown in FIG. 1;

FIG. 3A and FIG. 3B show examples of the shape of the reinforcement plate;

FIG. 4 is a graph showing an example of measured values of resonance frequency characteristics;

FIG. 5 shows a simplified model of axial rigidity; and

FIG. 6 is a cross-sectional view showing the structure of a main part of a magnetic disk apparatus according to another embodiment of the invention.

DETAILED DESCRIPTION OF THE PREFERRED EMBODIMENTS

Figure 1:
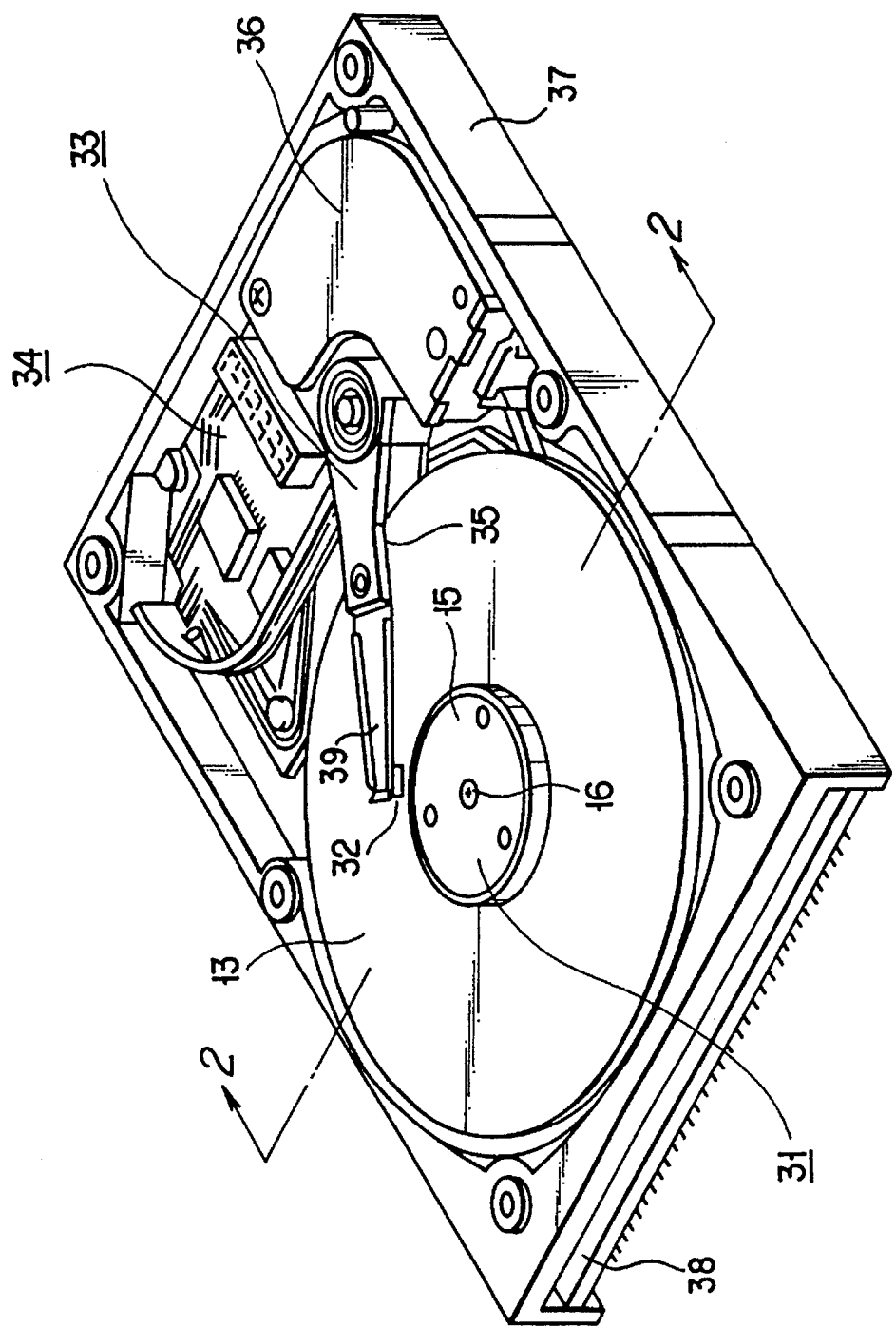
FIG. 1 is a perspective view showing the structure of a magnetic disk apparatus according to an embodiment of the present invention.

An embodiment of the present invention will now be described with reference to the accompanying drawings.

FIG. 1 is a perspective view showing the structure of a magnetic disk apparatus according to the embodiment of the invention. The magnetic disk apparatus comprises a disk rotating mechanism 31 for rotating a disk 13, a head moving mechanism 33 for moving a magnetic head 32, and flexible printed circuit board 34. This printed circuit board 34 is connected to a printed circuit board 38 attached to the bottom surface of a case 37. The circuit board 34 is provided with a preamplifier for amplifying a signal output, etc. The printed circuit board 38 is provided with a circuit for controlling the magnetic disk apparatus. The case 37 is sealed by a top plate (not shown) from external air and the clean condition of the inside thereof is maintained.

The disk rotating mechanism 31 comprises a spindle motor and a disk supporting mechanism, as shown in FIG. 2. The structure of the disk rotating mechanism 31 will be described later. The head moving mechanism 33 comprises an actuator 35 for supporting the magnetic head 32, and a voice coil motor 36 for driving the actuator 35. The magnetic head 32 is supported at an end portion of the actuator 35 via a suspension 39 and it flys over the magnetic disk 13 in accordance with the rotation of the disk 13. When the voice coil motor 36 is driven, the magnetic head 32 is moved in a radial direction of the disk 13 by means of the actuator 35, thus performing data read/write operations.

FIG. 2 shows the structure of the disk rotating mechanism. FIG. 2 is a cross-sectional view taken along line 2—2 in FIG. 1. In FIG. 2, a bracket 1 is formed of, e.g. die-cast aluminum material. A through-hole 2 is formed at a peripheral portion of the bracket 1. The bracket 1 is attached to a base plate 30, which is a part of the case 37, by engaging a screw (not shown) in the through-hole 2.

A cylindrical hub holder 3 is provided at an inner central portion of the bracket 1. A stator core 4 and a motor coil 5 are mounted on the outside of the hub holder 3. A lead wire 6 of the motor coil 5 extends to the outside through a through-hole 7 formed in the bracket 1. The through-hole 7 is filled with a dust-shielding seal member (not shown).

On the other hand, a shaft portion 10 of a motor hub 9 is rotatably mounted via bearings 8a and 8b on the inside of the hub holder 3. A yoke 11 and a magnet 12 are mounted on the inner peripheral surface of the motor hub 9 so as to face the stator core 4 and motor coil 5 at a predetermined distance. When the motor hub 9 is formed of a magnetic material, the hub itself functions as a yoke and therefore the yoke 11 can be omitted.

A flange portion 9a is formed at one end portion of the motor hub 9. The disk 13 is placed on the flange portion 9a and fixed by a disk clamper 15. In order to stably fix the disk 13, a spacer ring 14 is interposed between the disk 13 and the disk clamper 15. The disk clamper 15 has resiliency, and a center portion thereof is fixed to the hub 9 by means of a fastening screw 16.

A center part of the bracket 1, where the hub holder 3 is provided, is sealed from the outside by a seal member 17. In addition, a reinforcement plate 18 is attached to the outer part of the bracket 1, except the area of the seal member 17. The reinforcement plate 8 is designed to increase the rigidity of the bracket 1. The reinforcement plate 18 is made of a non-magnetic iron-based material, such as a stainless steel material or a steel plate (SPCC) which is subjected to rust-preventing treatment. In addition, the reinforcement plate 18 may be formed of a non-magnetic ceramic material. In this case, for example, an alumina-based ceramic material, titania-based ceramic material, and a zirconia-based ceramic material can be used.

FIGS. 3A and 3B show examples of the shape of the reinforcement plate 18. FIG. 3A shows a reinforcement plate 18 having a flange 19 at its peripheral portion, and FIG. 3B shows a reinforcement plate 18 having a simple circular shape. Each plate has a through-hole 20. The lead wire 6 of the motor coil 5 is extended through the through-hole 20. The location of the through-hole 20 coincides with that of the through-hole 7 in the bracket 1. The reinforcement plate 18 of FIG. 3A is used in the embodiment shown in FIG. 2.

In the case of using the reinforcement plate 18 with flange 19, the flange 19 is tightly fitted on the bottom portion of the bracket 1, thus mounting the plate 18 on the bracket 1. When the reinforcement plate 18 of FIG. 3B is used, the plate 18 is attached to the bottom surface of the bracket 1 by means of an adhesive or the like.

By attaching the reinforcement plate 18 on the bracket 1, the rigidity of the bracket and the rigidity of the motor disk assembly can be improved. As a result, the resonance frequency of the apparatus can be increased, and the vibration transmission coefficient can be reduced. Since the reinforcement plate 18 has a very high rigidity even if it is thin, the vibration-resistant properties can be increased without substantially increasing the thickness of the apparatus. In addition, by providing the reinforcement plate 18, the thickness of the bracket 1 can be decreased. Thus, the magnetic disk apparatus can be made thinner, while maintaining the same vibration-resistant properties as those of a conventional apparatus.

A method of measuring resonance frequencies will now be described.

In the state in which the disk 13 is mounted on the spindle motor, the bracket 1 of the spindle motor is fixed on the base plate 30 at the region of the through-hole 2 by means of a fastening screw. Impulses are applied to the upper end portion of the disk clamper 15 by an impact hammer or the like, thereby vibrating the disk 13. The vibration of the disk 13 at this time (vibration in the direction of the motor shaft) is measured by a non-contact displacement meter such as a laser displacement meter.

When the impact input signal is I and the measurement output signal is S, the vibration transmission function is found by FFT analysis, and a transmission gain as shown in FIG. 4 can be calculated. Thus, the resonance frequency f0(f1) and vibration transmission coefficient G0(G1) can be found. In FIG. 4, a dottedline indicates characteristics of a conventional apparatus, and a solid line indicates characteristics of the apparatus of the present invention. As can be seen from FIG. 4, since the rigidity of the bracket 1 is increased in the present invention, the resonance frequency of the apparatus can be increased from f0 to f1 and the vibration transmission coefficient can be reduced from G0 to G1.

In fact, it is necessary to measure the vibration characteristics in the radial direction of the disk which is perpendicular to the motor shaft, in addition to the vibration characteristics in the direction of the motor shaft. However, since both characteristics are mutually associated, the characteristics in the radial direction can be generally guessed from the measured resonance frequency in the direction of the motor shaft.

As has been described above, according to the present invention, the reinforcement plate 18 with high rigidity is attached to the bracket 1 of the spindle motor. Thus, the rigidity of the bracket as well as the rigidity of the motor disk assembly can be increased. As a result, it is possible to make the apparatus thinner, while increasing the resonance frequency of the apparatus, reducing the vibration transmission coefficient, and improving the vibration characteristics of the disk apparatus or maintaining desired vibration characteristics.

In the above embodiment, the bracket 1 is formed of an aluminum material and the reinforcement plate 18 is formed of a non-magnetic ion-based material or a ceramic material. However, the material of the bracket 1 is not limited to the aluminum material, and the bracket 1 can be made of a plastic material. When the bracket 1 is formed of a plastic material, the reinforcement plate 18 cannot be attached to the bracket 1 by means of an adhesive. Thus, the bracket 1 and reinforcement plate 18 are integrally formed as one body, e.g. by molding.

The location of the reinforcement plate 18 is not limited to the rear surface of the bracket 1. For example, the plate 18 may be attached to the upper surface of the bracket 1 or any other part where high rigidity is required. In this case, it is desirable to measure the vibration characteristics of each portion of the bracket 1 and attach the reinforcement plate 18 at a part having the worst vibration characteristics.

Another embodiment of the invention will now be described.

FIG. 6 shows the structure of a disk rotation mechanism 31 according to this embodiment. In the preceding embodiment, the rigidity of the bracket 1 is increased by the reinforcement plate 18. However, in this embodiment, the bracket 1 itself is formed of a high-rigidity material. In this case, the high-rigidity material is, for example, a non-magnetic iron-based material (e.g. non-magnetic stainless steel) or a ceramic material.

By using the non-magnetic iron-based material or ceramic material as the material of the bracket 1, the rigidity of the bracket 1, as well as the rigidity of the motor disk assembly, can be increased. Thereby, like the preceding embodiment, the resonance frequency of the apparatus can be increased and the vibration transmission coefficient can be decreased.

Moreover, by forming the bracket 1 itself of the high-rigidity non-magnetic ion-based material, the thickness of the bracket 1 can be remarkably decreased and the entire magnetic disk apparatus can be made thinner, while increasing the rigidity of the bracket.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic disk apparatus having a base plate, the apparatus comprising:

a recording medium for storing data;

a motor for rotating the recording medium, the motor having a shaft, the motor having a bracket at a bottom portion thereof, the bracket having a central hub holder for supporting the shaft, an outer periphery attached to the base plate, and a surface area extending from the hub holder toward the outer periphery; and a reinforcement plate, attached to the bracket of the motor in continuous contact with the surface area for increasing the rigidity of the bracket.

2. The apparatus according to claim 1, wherein the bracket is formed of aluminum or a plastic material.

3. The apparatus according to claim 1, wherein the reinforcement plate is formed of a non-magnetic iron-based material or a ceramic material.

4. The apparatus according to claim 1, wherein the reinforcement plate is attached to the outer surface of the bracket.

5. A magnetic disk apparatus having a base plate comprising:

a recording medium for storing data;

a motor for rotating the recording medium, the motor including, a hub for supporting the recording medium, the hub having a central shaft, a bracket provided at a bottom portion of the motor, the bracket having a central hub holder for supporting the shaft, an outer periphery attached to the base plate, and a surface area extending from the hub holder toward the outer periphery, and means for rotating the hub; and a reinforcement plate, attached to the bracket of the motor in continuous contact with the surface area for increasing the rigidity of the bracket.

6. The apparatus according to claim 5, wherein the reinforcement plate is formed of a non-magnetic iron-based material or a ceramic material.

7. The apparatus according to claim 5, wherein the

8. The apparatus according to claim 5, wherein the reinforcement plate is attached to the outer surface of the bracket.

* * * * *

UNITED STATES PATENT AND TRADEMARK OFFICE
CERTIFICATE OF CORRECTION

PATENT NO. : 5,479,304
DATED : December 26, 1995
INVENTOR(S) : Isao MORITA et al It is certified that error appears in the above-indentified patent and that said Letters Patent is hereby corrected as shown below:

Abstract, title Page, Lines 10 & 11, "A reinforcement plate made of an ion-based material or a ceramic material on a bottom surface of the bracket." should read --A reinforcement plate made of a non-magnetic iron-based material or a ceramic material is attached to a bottom surface of the bracket.--

Claim 7, Column 6, line 52, after "wherein the" insert --bracket is formed of aluminum or a plastic material--.

Signed and Sealed this

Nineteenth Day of November, 1996

Attest:

BRUCE LEHMAN

Attesting Officer

Commissioner of Patents and Trademarks